No. 701,035. Patented May 27, 1902.
N. N. HAIGH & T. SUGDEN.
STEAM TRAP.
(Application filed Sept. 13, 1901.)
(No Model.) 7 Sheets—Sheet 1.

Witnesses:
Alice Richmond Brown
Rollin Abell

Inventors
Noel Newall Haigh,
and Thomas Sugden
by Frank Parker Davis, Atty.

No. 701,035. Patented May 27, 1902.
N. N. HAIGH & T. SUGDEN.
STEAM TRAP.
(Application filed Sept. 13, 1901.)
(No Model.) 7 Sheets—Sheet 2.

Witnesses:
Alice Richmond Brown
Rollin Abell

Inventors
Noel Newall Haigh
and Thomas Sugden
by Frank Parker Davis
Atty

No. 701,035. Patented May 27, 1902.
N. N. HAIGH & T. SUGDEN.
STEAM TRAP.
(Application filed Sept. 13, 1901.)
(No Model.) 7 Sheets—Sheet 5.

Witnesses:
Alice Richmond Brown
Rollin Abell.

Inventors
Noel Newall Haigh
and Thomas Sugden

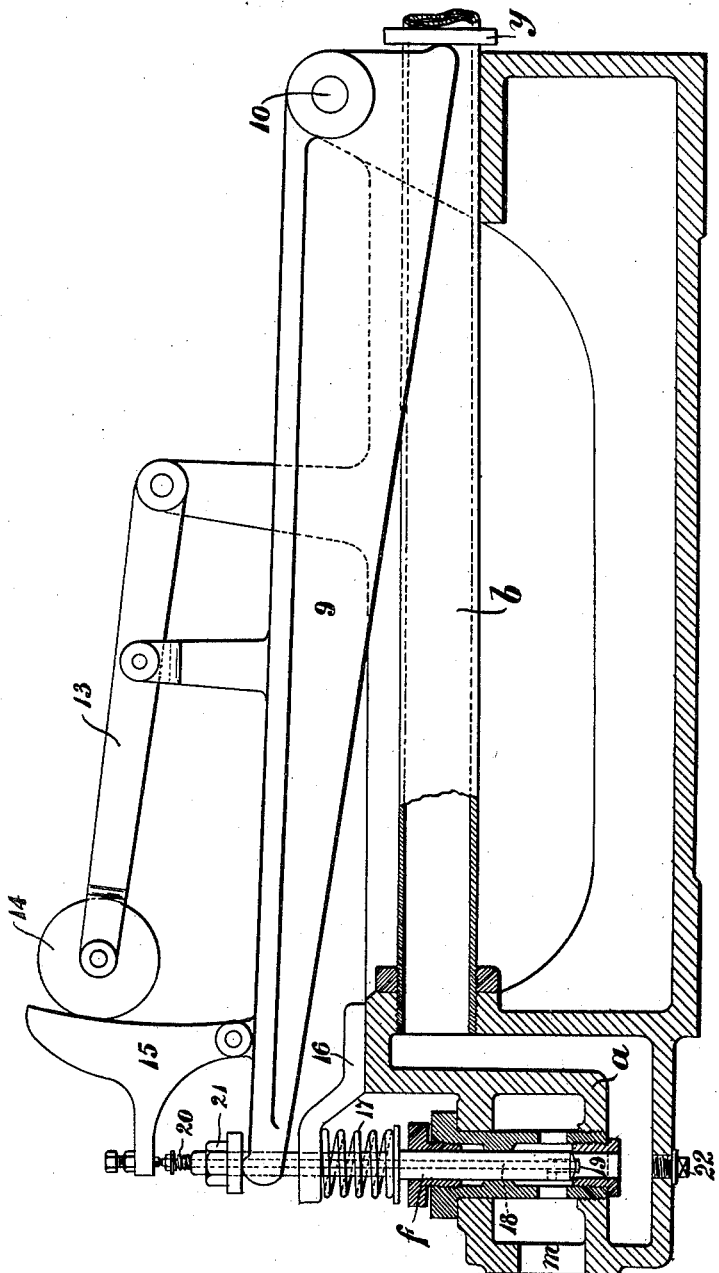

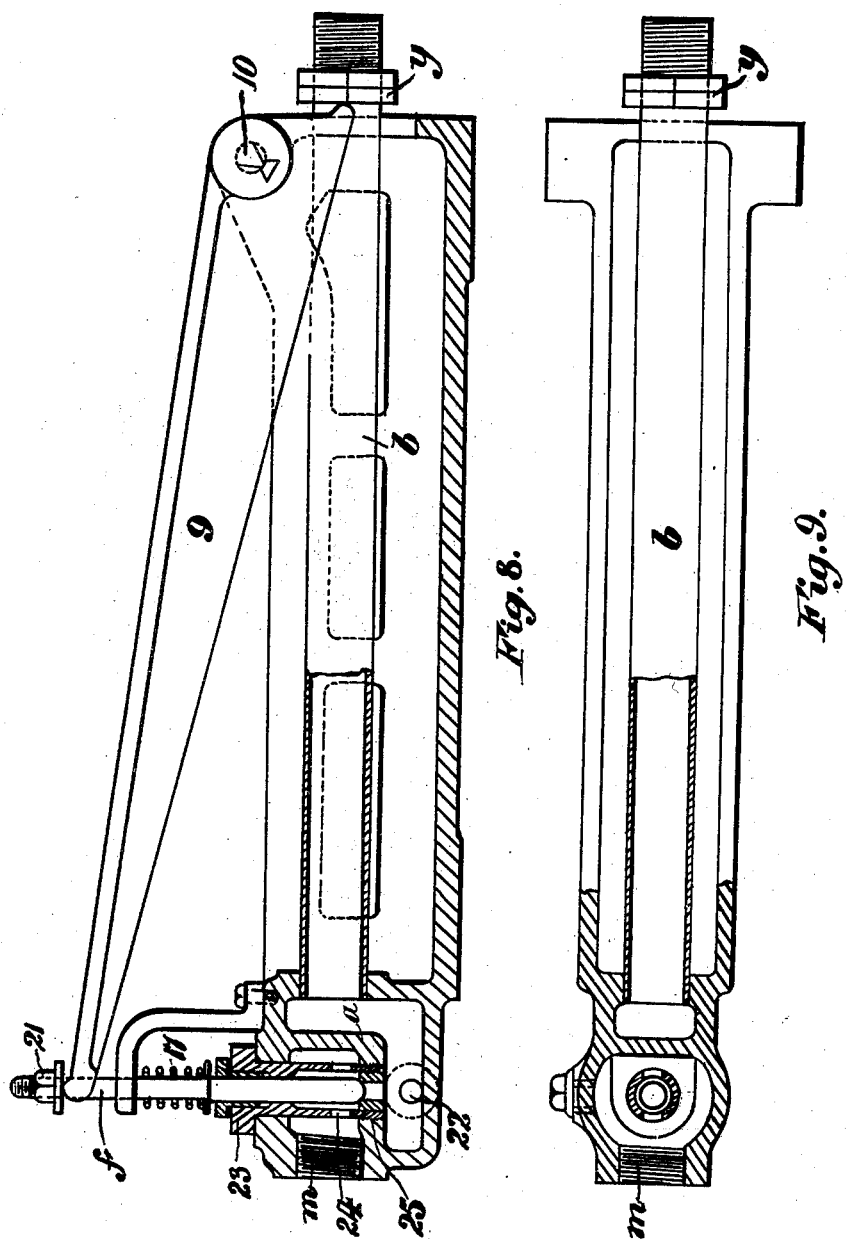

UNITED STATES PATENT OFFICE.

NOEL NEWALL HAIGH, OF OLDHAM, AND THOMAS SUGDEN, OF EAST DULWICH, ENGLAND.

STEAM-TRAP.

SPECIFICATION forming part of Letters Patent No. 701,035, dated May 27, 1902.

Application filed September 13, 1901. Serial No. 75,275. (No model.)

*To all whom it may concern:*

Be it known that we, NOEL NEWALL HAIGH, engineer, residing at Globe Iron Works, Plane street, Oldham, and THOMAS SUGDEN, engineer, residing at 26 Underhill road, East Dulwich, in the county of Surrey, England, subjects of the King of Great Britain and Ireland, have invented certain new and useful Improvements in Steam-Traps, (for which we have made application for patent in Great Britain, No. 6,522, dated March 28, 1901,) of which the following is a specification.

This invention relates to improvements in connection with steam-traps, the object being to provide a trap in which under the expansion and contraction occasioned by the movement of a tube or tubes a positive thrust or release of thrust is given to the spindle of a valve, so as to open such valve at a time when water accumulates in the apparatus irrespective of the pressure under which the steam-trap is working.

In the ordinary type of steam-traps as at present commonly constructed great difficulty ensues in providing for the effective working of the trap at varying steam-pressures, owing to a greater expansion and contraction arising when the pressures are increased. By our present invention we are enabled to utilize the movement occasioned by expansion and contraction, so that no greater strain is induced or given to the operative parts of the steam-valve at the varying pressures under which it is working. We accomplish this automatically or by independent adjustment, as may be desired, to suit the varying working pressures.

Figure 1:
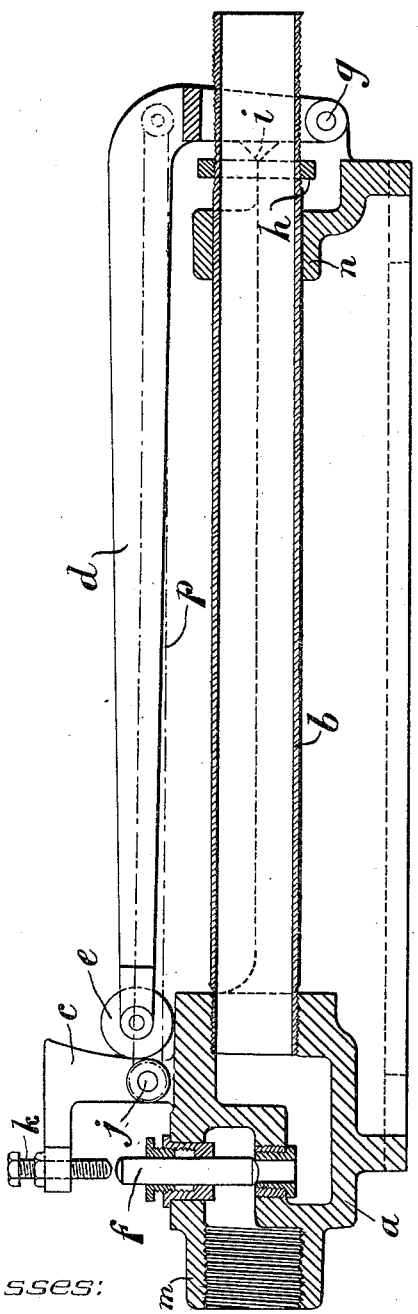
Figure 2:
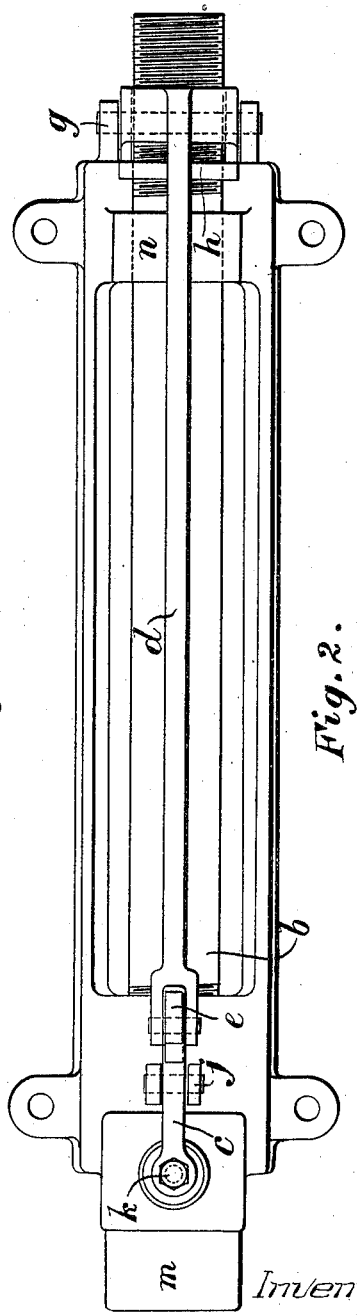
Figure 3:
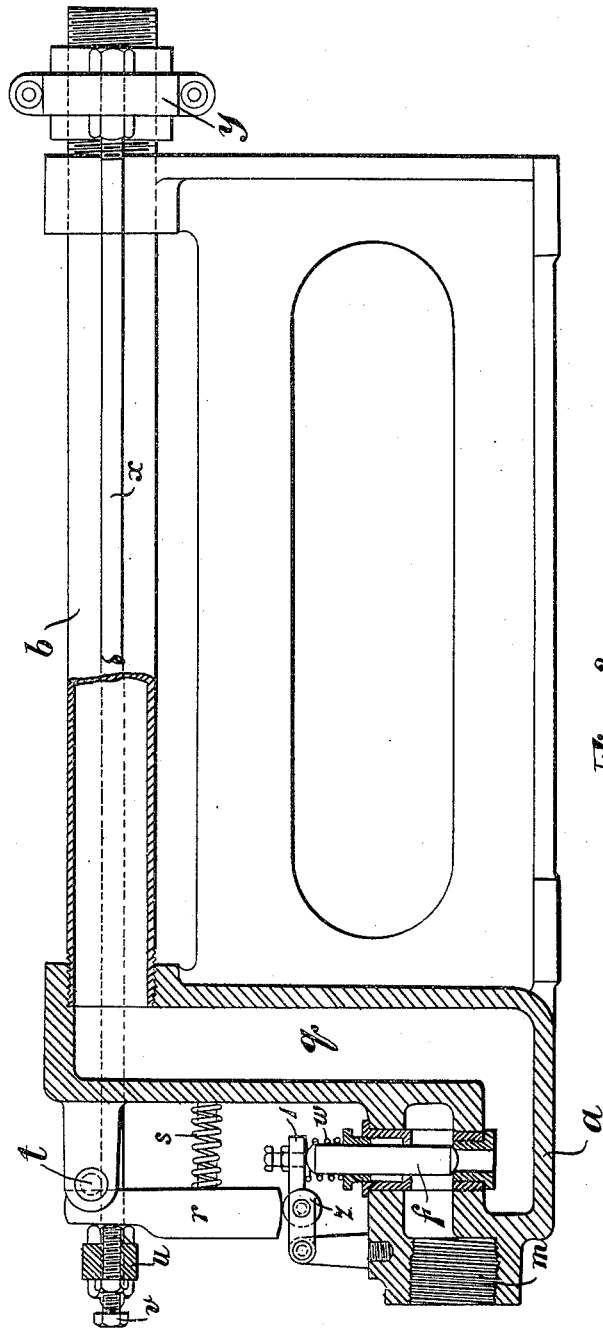

In the accompanying drawings, Figure 1 is a sectional elevation, and Fig. 2 is a plan, of one form of our improved trap. Figs. 3, 4, 5, 6, and 7 are sectional elevations of modifications of our invention. Fig. 8 is a part-sectional elevation, and Fig. 9 a part-sectional plan, of a simple form of our trap.

In carrying our invention into effect in one convenient manner we employ in one type of trap which we manufacture a single tube $b$, into which the steam and water of condensation are allowed to accumulate. The one end of the tube $b$ we connect to a fixed boss or portion of the apparatus $a$, while the other end passes through a guide or boss $n$ freely and carries upon its outer end a collar $h$ or other saddle-like member or lever, which thrusts against the lever $d$ at $i$ or is connected to a rod or rods for thrusting upon a moving lever $c$, mounted upon a pivot $j$ at the opposite end of the bracket or casing of the apparatus. We connect the steam-pipe or the like to the free end of the tube in such a manner that while it is employed to drain the pipe system or the like it is capable of moving under the varying temperatures caused when water collects in the pipe. On the end of the bracket or frame in which the tube is fixed we provide a plain valve $f$ or a mushroom, equilibrium, or other ordinary type of valve, such that the pressure of the steam and water acts beneath the valve with a tendency to raise it off its seat, and when the valve or valve-spindle is thus raised from its seat the water which passes through the valve escapes through an outlet branch $m$, suitably provided upon the end of the frame or casing. The upper end of the valve-spindle we cause to be thrust upon by means of adjustable stud $k$, as in Fig. 1, or by means of a lever or spring. When employing a lever $r$, as in Figs. 3 and 4, we cause the thrust or movement of the tube $b$ to be communicated by rods $x$ to a cross-head $u$, which is provided with an adjustable screw $v$ for thrusting against the upper end of the lever $r$, which is pivoted at $t$. The lower end of this lever $r$ we cause to thrust against a roller $z$, mounted upon a lever 1, thus keeping the valve $f$ on its seat, a small spring $w$ being arranged below this lever to keep the roller in contact with the cam-like path formed upon the end of the lever $r$. We arrange a spring $s$ behind the lever $r$ to insure that the lever shall return when the thrust from the rods is released, owing to the accumulation of water within $b$ and the consequent contraction of the tube.

The operation of our apparatus, as illustrated in Figs. 1 and 2, is such that when the tube $b$ expands the roller $e$ on lever $d$ is caused to move in an arc about the pivot $g$ and to travel up the curved lever $c$, which thrusts the pin $k$ upon the valve-spindle. The action of this lever and spindle is such that as the tube expands and causes the lever or roller to move up the inclined or radial path greater pressure is thereby placed upon the path, owing to the greater leverage of such lever, which thrusts upon the valve-spindle; but at the same time the steam-pressure, which acts upon the opposite end of the valve $f$, thrusts outward with a greater force, so that the tendency which would otherwise arise for the valve to open and to let steam pass when a predetermined pressure had been exceeded does not cause the valve to open, inasmuch as the extra leverage on the thrust-lever $c$ is balanced by the extra pressure on the valve-spindle. By this arrangement of counterbalancing of pressure and leverage we insure that upon water collecting in the steam-trap, so as to reduce the temperature, then the valve will be opened irrespective of the pressure at which the steam stands in the apparatus.

In order to assist the valve-spindle, we may place a spring which acts to raise the valve off its seat, and thus to give the constant tendency for the valve to be lifted, the moment the pressure upon the spindle-head is reduced.

In another form of steam-trap, which we construct as illustrated in Fig. 7, we sometimes find it convenient to mount the free end of the lever 9 so that it acts positively to raise the valve from its seat by thrusting against an adjustable nut or collar 21, the spring 17 tending to keep the valve $f$ on its seat, while in combination with the moving lever 9 we arrange a moving arm to travel up a path formed upon a thrust-lever, which thus increases the pressure on the lever, while the effort to raise the valve is constant. We accomplish this in one convenient manner by connecting a supplementary lever 13 to the moving long-armed lever 9, which is pivoted at 10 to the bracket or casing of the trap, and on this supplementary lever 13 we form a roller or the like 14 for traveling up the inclined or radial cam-like path formed upon the thrust-lever 15, which operates to transmit the thrust onto the valve-spindle or onto a pilot inner valve-spindle 18 19, the spring 20 being adjusted to keep the valve 19 on its seat upon the main valve $f$. By this arrangement of valve the spring 17 shuts the valve, while the lever 9 opens it.

Figure 5:
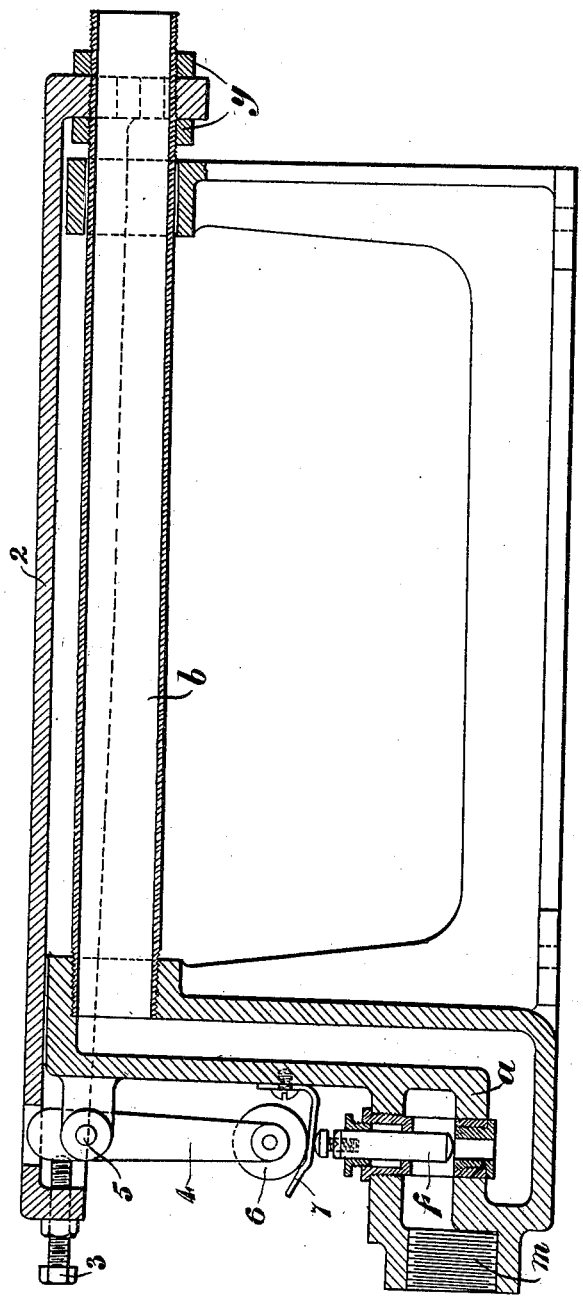
Figure 6:
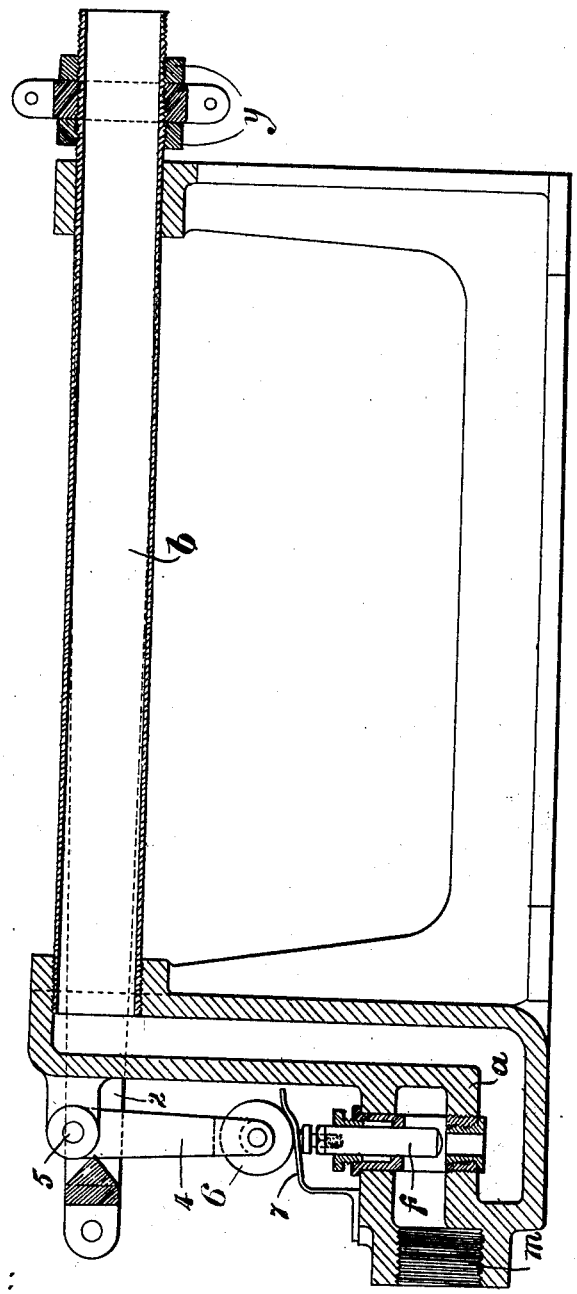

When constructing another form of trap for use, we mount upon the trap-casing, as shown in Figs. 5 and 6, a lever 2, which is in connection with the moving or free end of the tube by the nuts or collars $y$, and we cause the positive movement of the thrust-collars or other member or members on the tube to actuate the lever, while the other or free end of this lever we cause to rest against, Fig. 6, or a pin 3, Fig. 5, thereon to thrust against the end of a lever 4, pivoted at 5 to the bracket. The lower end of the lever 4 we provide with a roller 6, which thrusts upon a spring-like cam-plate 7, and thus to keep the valve $f$ on its seat. We provide an adjustable head to the end of the valve-spindle, as illustrated in Figs. 5 and 6.

By varying the method of mounting the levers and spring we reverse the operations of the spring and the lever thrust when so desired for any particular type of valve which is to be employed in our improved form of steam-trap.

Figure 4:
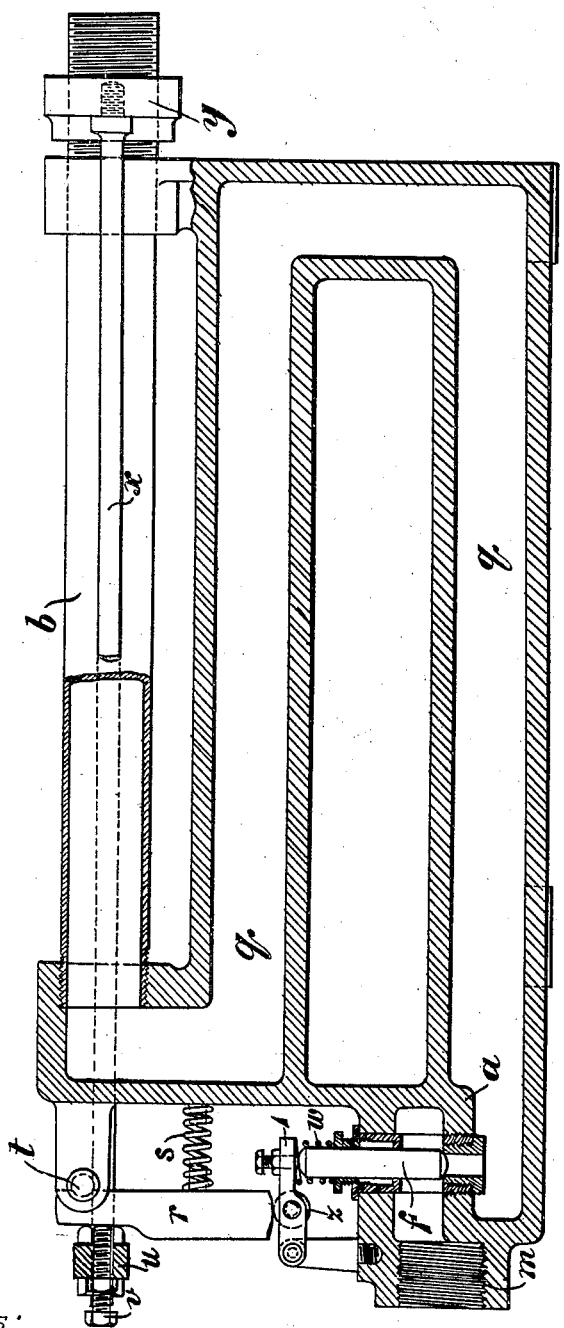

We sometimes arrange a tie-rod $p$, as shown in dotted lines on Fig. 1, to work in connection with a loose head $c$, so as to take the strain off the apparatus, and we allow the block or lever $c$ to slide upon the upper surface of the boss, while the roller $e$ thrusts against the curved path to keep the stud $k$ in contact with the valve-spindle $f$ when steam is within the tube $b$. We prefer to arrange our casing as shown in Fig. 4, so that a large area or long passage $q$ is available for the collection of water.

When constructing a trap with a minimum number of moving parts and with a valve-spindle which is to be adjusted by hand to suit varying pressures, we arrange the trap as shown in Figs. 8 and 9. In this trap the tube $b$ contracts and carries with it the thrust lock-nuts $y$, which move the lever 9, so that its upper end raises the nut 21 on the valve-spindle $f$, while the spring 17 tends to carry the valve or spindle back onto its seat. We prefer to form the valve-seating in combination with the gland-bush 23 with a collar at end 23 and screwed in the casing at end 25, or the seating may be formed by a separate plug 25, screwed into the casing, and to minimize the friction of the joint 10 we may form the fulcrum as a knife-edge bearing. We provide a dirt-outlet or cleaning hole or plug 22 in any convenient position within our casing.

We do not limit the application of our invention to any particular type of casing or to any special material for constructing the tube or tubes for receiving the water, and we modify the form of valve and the types of levers and connections employed to suit the size of valve to be constructed and the purposes and pressures for which it is required to work.

Having now described our invention, what we claim as new, and desire to secure by Letters Patent, is—

1. In a steam-trap of the character described, the combination of an elongated casing or base-support having a valve-box at one end and a guide at the other end; a thermostatic steam and water tube having one end secured to the casing at the valve-box end of the latter and having its other end loosely engaged with the guide at the opposite end of the casing, said tube communicating with the interior of the valve-box; a valve in the latter controlling the outflow of water of condensation; and operating connections between the movable end of the tube and said valve.

2. In a steam-trap of the character described, the combination of a suitable casing having a steam and water passage-way, a thermostatic tube connected at one end with the casing and communicating with the interior passage-way thereof, a valve in the latter controlling the outflow of water of condensation, a valve-actuating member engaged with the free end of the tube and extending to the opposite end thereof, and operating connections between said member and the valve, substantially as described.

3. In a steam-trap of the character described, the combination of a casing or support, a thermostatic steam and water tube, a valve controlling the condensation-outlet, a cam arranged to increase resistance to opening of said valve as said tube expands, and suitable connections between the tube and the cam operating upon the latter to increase cam-pressure on the valve with expansion of the tube, substantially as described.

4. In a steam-trap of the character described, the combination of a casing or support, a thermostatic steam and water tube, a valve controlling the condensation-outlet, a roller-equipped lever coacting with the said tube, and a cam engaged by the roller and coacting with the valve, substantially as described.

5. In a steam-trap of the character described, the combination of a casing or support, a thermostatic steam and water tube having one end fixed and the other end free, a valve in the casing controlling the condensation-outlet, a lever engaged with the valve and compounded with a cam at the fixed end of the tube, said cam engaged with the valve, and connections between the said lever and the free end of the tube.

6. In a steam-trap the combination of a support or casing comprising a valve-box and having a steam and water passage-way leading thereto, a thermostatic steam and water tube secured at one end to a part of said casing and slidingly engaged at the other end with another part of the casing, said tube communicating with the passage-way therein, a valve in the valve-box of the casing controlling outflow of water of condensation, and suitable connections between the free end of the tube and said valve, substantially as and for the purpose described.

7. In a steam-trap in combination a casing having a double water-collecting channel or passage therein, a collecting-tube with one end secured thereto a valve seating within the casing, means for transmitting the movement or thrust from the end of the collecting-tube to the valve-spindle substantially as described.

In witness whereof I, the said NOEL NEWALL HAIGH, have hereunto set my hand in the presence of two witnesses.

NOEL NEWALL HAIGH.

Witnesses:
R. M. NEILSON,
A. HUGHES.

In witness whereof I, the said THOMAS SUGDEN, have hereunto set my hand in the presence of two witnesses.

THOMAS SUGDEN.

Witnesses:
THOMAS ELEY,
HARRIS W. CORY.